(No Model.)
D. W. AYLWORTH.
PLASHED HEDGE.
No. 548,500. Patented Oct. 22, 1895.
Fig. 1.
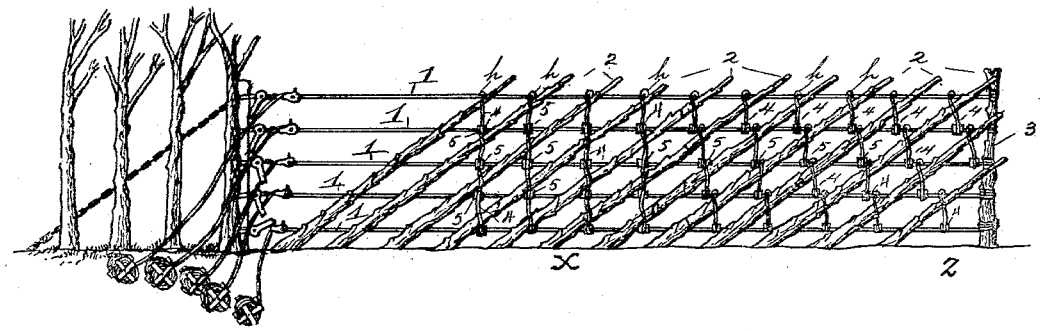
Fig. 2.
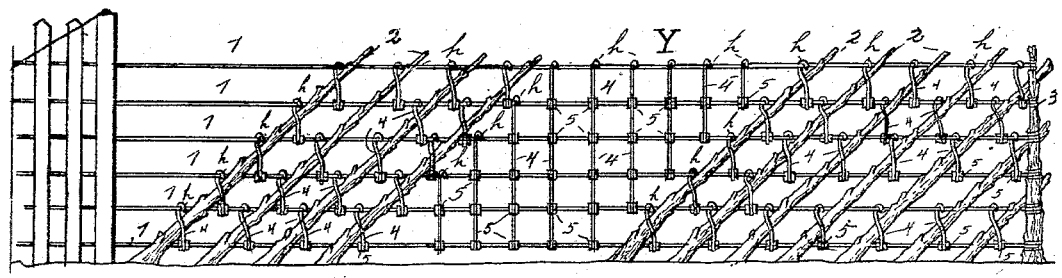
Fig. 3.
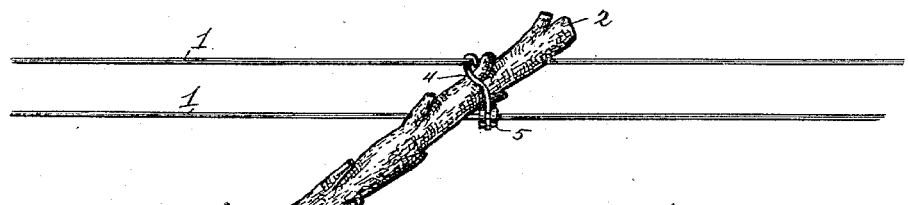
Fig. 4.
Fig. 5.
Witnesses
Geo. O. Willett
C. H. Neely
Inventor
Daniel W. Aylworth
by Wm. M. Monroe
Attorney.

UNITED STATES PATENT OFFICE.

DANIEL W. AYLWORTH, OF OTTAWA, ILLINOIS.

PLASHED HEDGE.

SPECIFICATION forming part of Letters Patent No. 548,500, dated October 22, 1895.

Application filed July 13, 1895. Serial No. 555,859. (No model.)

*To all whom it may concern:*

Be it known that I, DANIEL W. AYLWORTH, a citizen of the United States, and a resident of Ottawa, county of La Salle, State of Illinois, have invented certain new and useful Improvements in Plashed Hedges, of which I hereby declare the following to be a full, clear, and exact description, such as will enable others skilled in the art to which it appertains to make and use the same.

My invention relates to improvements in combined wire and hedge fences, and the objects of the invention are to provide means for securing the canes or stems of a plashed hedge in a diagonal position without injury to the plants.

My invention consists in the horizontal wires and vertically-arranged clamping-links, with the means for securing the links and for maintaining the canes in their diagonal position, as hereinafter described, shown in the accompanying drawings, and more specifically pointed out in the claim.

In the accompanying drawings, Figure 1 is an elevation of my improved fence, showing the manner of construction and method of securing the canes. Fig. 2 is a similar elevation showing a similar arrangement of wires adapted to fill a gap in the growth of the plants. Fig. 3 is a detail of one of the links in elevation. Figs. 4 and 5 show perspective views of link and clamp for the link, Fig. 5 showing them *in situ.*

In the views, 1 is a horizontal wire, the number of these wires depending upon the height of the hedge when plashed.

2 2 are the canes or stems of the plants which comprise the hedge.

3 is the end plant which remains vertical and serves as a post to secure the horizontal wires.

4 is a link bent to form a hook *h* at the upper end which hangs upon the upper horizontal wire, and passing over one of the canes is clamped tightly to the next horizontal wire below, thus binding the cane against the horizontal wires. A clamp 5 is used to secure the lower end of the link, as seen in detail in Figs. 4 and 5, where 6 is the body of the clamp, grooved at 7 to receive the vertical wire and provided with loops 8, which are pressed over the horizontal wire, as shown in Fig. 5. As shown at the right of Fig. 1 at Z and in Fig. 2, a series of these links secure the whole length of each cane from top to bottom.

In the center of Fig. 1 at X is seen a variety of constructions in which the links are continuous from top to bottom of the fence, bending between each of the horizontal wires to include a cane, thus practically weaving the canes into the fence.

At Y, Fig. 2, is seen a portion of the fence adapted to fill a gap where the plants have died or been broken away, and in this construction the continuous form of link is employed, lessening in length at the extremities to follow the inclination of the canes. Any convenient method of stretching the canes may be employed, that not being material to the invention.

The advantages of the form of fence shown are obvious, since vertically-growing hedges shed their lower limbs and become inefficient for turning small stock. Plashing, also, dwarfs the growth of the main cane and materially lessens the labor of pruning. It also starts a vertical growth along the top of each cane and reduces the space between the canes.

In the system shown and described no injury whatever is done the canes, no staples are driven into them or cuts made in them, while the adjustment is so easy that any one can put it together without the exercise of unusual care.

Having described my invention, what I claim as new, and desire to secure by Letters Patent, is—

In a plashed hedge fence, supported upon horizontal wires, a fastener for the same, consisting in the combination with a hooked wire link, of a metal clamp for the wire crossings said clamp being provided with a grooved back for the vertical wire, and loops adapted to compress the horizontal wire, substantially as set forth.

DANIEL W. AYLWORTH.

Witnesses:
WM. M. MONROE,
E. H. NEVILLE.